United States Patent
Krakowski

(10) Patent No.: US 9,123,143 B2
(45) Date of Patent: Sep. 1, 2015

(54) SYSTEM AND METHOD FOR MOTION SICKNESS MINIMIZATION USING INTEGRATION OF ATTENDED AND UNATTENDED DATASTREAMS

(76) Inventor: Aaron I. Krakowski, Bronx, NY (US)

( * ) Notice: Subject to any disclaimer, the term of this patent is extended or adjusted under 35 U.S.C. 154(b) by 848 days.

(21) Appl. No.: 13/207,964

(22) Filed: Aug. 11, 2011

(65) Prior Publication Data

US 2013/0038599 A1 Feb. 14, 2013

(51) Int. Cl.
*G06T 11/00* (2006.01)

(52) U.S. Cl.
CPC ........... *G06T 11/00* (2013.01); *G09G 2380/08* (2013.01)

(58) Field of Classification Search
CPC ............ G06T 15/00; G09G 5/00; G09G 5/02; H04B 1/00
USPC ........................................................ 345/629
See application file for complete search history.

(56) References Cited

U.S. PATENT DOCUMENTS

| | | | |
|---|---|---|---|
| 5,161,196 A * | 11/1992 | Ferguson ........................... | 381/1 |
| 5,873,080 A * | 2/1999 | Coden et al. ...................... | 1/1 |
| 5,957,138 A * | 9/1999 | Lin et al. ....................... | 600/453 |
| 6,443,913 B1 | 9/2002 | Kania | |
| 6,497,649 B2 | 12/2002 | Parker et al. | |
| 6,692,428 B1 | 2/2004 | Kania | |
| 6,791,568 B2 * | 9/2004 | Steinberg et al. ............. | 345/600 |
| 6,866,225 B2 | 3/2005 | Jones et al. | |
| 6,932,090 B1 | 8/2005 | Reschke | |
| 7,046,259 B2 | 5/2006 | Humphries | |
| 7,128,705 B2 | 10/2006 | Brendley et al. | |
| 7,417,638 B2 * | 8/2008 | Saito .............................. | 345/531 |
| 7,717,841 B2 | 5/2010 | Brendley et al. | |
| 7,722,526 B2 | 5/2010 | Kim | |
| 2002/0005859 A1 * | 1/2002 | Murata .......................... | 345/629 |
| 2002/0180757 A1 * | 12/2002 | Duerr et al. .................... | 345/620 |
| 2003/0132909 A1 * | 7/2003 | Haynes .......................... | 345/156 |
| 2005/0134900 A1 * | 6/2005 | Kuwata ......................... | 358/1.15 |
| 2005/0167546 A1 * | 8/2005 | Jones et al. ................. | 244/118.5 |
| 2006/0004630 A1 * | 1/2006 | Criddle et al. .................. | 705/14 |
| 2006/0015000 A1 * | 1/2006 | Kim ............................... | 600/27 |
| 2006/0238442 A1 * | 10/2006 | Uhlhorn et al. .................... | 345/8 |
| 2007/0034212 A1 * | 2/2007 | Brendley et al. .............. | 128/897 |
| 2007/0280519 A1 * | 12/2007 | Spies et al. .................... | 382/131 |
| 2009/0002142 A1 * | 1/2009 | Morimoto et al. .......... | 340/425.5 |
| 2009/0109221 A1 * | 4/2009 | Planck et al. ................. | 345/426 |
| 2011/0063209 A1 * | 3/2011 | Fang ............................... | 345/157 |
| 2011/0187651 A1 * | 8/2011 | Whitlow et al. .............. | 345/173 |

OTHER PUBLICATIONS

Abstract of Rolnick et al., Performance and Well Being Under Tilting Conditions, Aviat Space Environ. Med., 60(8), pp. 779-785 (1989).

(Continued)

*Primary Examiner* — David Zarka
*Assistant Examiner* — Brian Kravitz

(57) ABSTRACT

A system for simultaneous visual data presentation is provided having a processor and memory with instructions for execution by the processor for: receiving attended data; receiving unattended data; and generating presentation data. The presentation is suitable for simultaneous presentation of the attended data and the unattended data in a manner in which the unattended data at least partially overlaps the attended data and the unattended data does not interfere with the attended data by replacing, erasing, or suppressing the attended data, and vice versa. The presented unattended data gives cues that the user can sense and provide information to the user while attending to the presented attended data, without attending to the presented unattended data.

19 Claims, 6 Drawing Sheets

(56) References Cited

OTHER PUBLICATIONS

Abstract of Rolnick et al., Why is the Driver Rarely Motion Sick? The Role of Controllability in Motion Sickness, Ergonomics, 34(7), pp. 867-879 (1991).

Abstract of Rolnick et al., The Effects of Motion Induced Sickness on Military Performance, Handbook of Military Psychology, pp. 279-293 (1991).

Perception, vol. 35, Supp., Abstracts, ECVP 2006, 29th EP Conference on Visual Perception, St. Petersburg, cover page and p. 222 (Aug. 2006).

Bles et al., Appropriate Use of Virtual Environments to Minimise Motion Sickness, TNO Human Factors, RTO MP-058, The Netherlands, pp. 7-1-7-9 (Apr. 2000).

Golding, JF, Motion Sickness Susceptibility, Autonomic Neuroscience: Basic and Clinical, 129, pp. 67-76 (2006).

* cited by examiner

SYSTEM AND METHOD FOR MOTION SICKNESS MINIMIZATION USING INTEGRATION OF ATTENDED AND UNATTENDED DATASTREAMS

FIELD OF THE INVENTION

The present disclosure relates generally to a system and method for simultaneously presenting different sets of displayable data on the same display screen for minimizing motion sickness. In particular, the present disclosure relates to a system and method for simultaneously displaying a set of attended data that a user wants to attend to, and a set of unattended data on the same display screen for minimizing motion sickness, wherein the unattended data and attended data are combined without obstructing or interfering with one another.

BACKGROUND

The brain is hardwired for processing parallel sensory data-streams in an automatic manner. Some of these sensory processes are consciously learned and reliant on attention, such as browsing the web or watching a movie. Others are subconscious and instinctive, such as the detection of neurotoxin influence in the brain, based on discordant multisensory events. In the modern world, some of these instinctive processes are less than beneficial. For instance, the neural system for detecting neurotoxins triggers motion sickness in otherwise healthy individuals when they travel in moving vehicles. In fact, motion sickness is an ailment that afflicts countless millions and inhibits their ability to perform basic tasks, such as reading while traveling.

Motion sickness is due to discordant multisensory events that may occur when a person is travelling while attending visually to something other than the view that is ahead of the person. The vestibular system senses the motion, whereas the visual system acquires information that is inconsistent with that acquired by the vestibular system. The inconsistency or multisensory discord may trigger a defensive biological response hardwired for the detection and elimination of ingested neurotoxins that lead to similar sensory-discordance in the mammalian brain.

SUMMARY

The present disclosure is directed to a system for simultaneous data presentation. The system includes at least one tangible processor and a memory with instructions to be executed by the at least one tangible processor for: receiving attended data, including data for a user to attend to by paying attention to the data; receiving unattended data, which includes data for the user to sense and process even when the user does not attend to it; receiving motion data, which corresponds to motion that is sensed by a sensing device or simulated motion; modifying the unattended data in accordance with the received motion data; and generating presentation data. The generated presentation data is adapted and configured for presentation by a presentation device for simultaneous presentation of the attended data and the modified unattended data in a manner in which the unattended data at least partially overlaps the attended data and the unattended data does not interfere with the attended data by replacing, erasing, or suppressing the attended data, and vice versa. The presented modified unattended data gives cues about the sensed or simulated motion for the user to sense and process for compensating for discordant multisensory information and minimizing motion sickness while attending to the presented attended data, without a need for the user to attend to the presented unattended data.

The present disclosure is also directed to a system for simultaneous data presentation. The system includes at least one tangible processor and a memory with instructions to be executed by the at least one tangible processor for: receiving attended data, including data for a user to attend to by paying attention to the data; receiving unattended data, which includes data for the user to sense and process even when the user does not attend to it; and generating presentation data. The generated presentation is adapted and configured for presentation by a presentation device for simultaneous presentation of the attended data and the unattended data in a manner in which the unattended data at least partially overlaps the attended data and the unattended data does not interfere with the attended data by replacing, erasing, or suppressing the attended data, and vice versa. The presented unattended data gives unconscious cues for the user to sense and process for providing information to the user while attending to the presented attended data, without a need for the user to attend to the presented unattended data.

The present disclosure is further directed to a method for simultaneous data presentation. The method includes receiving by at least one hardware processor attended data that is suitable for displaying on a display device, including data for a user to attend to by paying attention to the data. The method further includes receiving by the at least one hardware processor unattended data suitable for displaying on the display device, which includes data for the user to sense and process even when the user does not attend to it, and receiving by the at least one hardware processor motion data, which corresponds to motion that is sensed by a sensing device or simulated motion. The method also includes modifying by the at least one hardware processor the unattended data in accordance with the received motion data, and generating by the hardware processor presentation data. The generated presentation data is suitable for displaying on the display device and provides for simultaneous display of the attended data and the modified unattended data in a manner in which the unattended data at least partially overlaps the attended data and the unattended data does not interfere with the attended data by replacing, erasing, or suppressing the attended data, and vice versa. The displayed modified unattended data gives cues about the sensed or simulated motion for the user to sense and process for compensating for discordant multisensory information and minimizing motion sickness while attending to the displayed attended data, without a need for the user to attend to the displayed unattended data.

The present disclosure is yet further directed to a data integration system including at least one tangible processor and a memory with instructions to be executed by the at least one tangible processor for receiving two sets of audio data from respective independent sound sources, receiving a first and second control signal, selectively modulating either of the received audio data sets in accordance with the first control signal, combining the two audio data sets into a combined audio data set in accordance with the second control signal, and outputting the combined audio data set to a single output device. The combined audio data set is adapted and configured for a user to attend to an audio data set selected from the two audio data sets, wherein the selection is via the second control signal.

Other features of the presently disclosed system for simultaneous data presentation will become apparent from the following detailed description, taken in conjunction with the accompanying drawings, which illustrate, by way of example, the presently disclosed system.

BRIEF DESCRIPTION OF THE DRAWINGS

Various embodiments of the present disclosure will be described below with reference to the figures, wherein.

DETAILED DESCRIPTION

Figure 1:
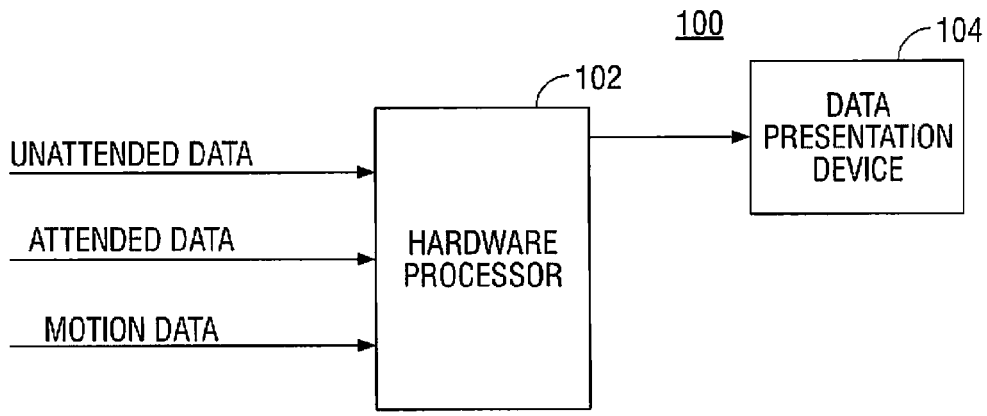
FIG. 1 is block diagram of an exemplary motion sickness minimization system in accordance with the present disclosure.

Referring now to the drawing figures, in which like reference numerals identify identical or corresponding elements, the motion sickness minimization system and method in accordance with the present disclosure will now be described in detail. With initial reference to FIG. 1, an exemplary motion sickness minimization system in accordance with the present disclosure is illustrated and is designated generally as motion sickness minimization (MSM) system 100.

MSM system 100 includes a hardware processor 102 receiving attended data, unattended data, and motion data. The motion data corresponds to motion that is sensed by a sensing device. The hardware processor 102 processes the attended data and unattended data so that they are presented by a data presentation device 104 simultaneously such that the unattended data does not obstruct or interfere with the attended data, e.g., by replacing, erasing, or suppressing the attended data, and vice versa. This simultaneous presentation of the attended and unattended data may occur so that the unattended data at least partially overlaps the attended data and, e.g., displayed at the same pixel location or adjacent or very close pixel locations that when displayed appear as if they are displayed in the same location. To accomplish this, the processor 102 combines the attended and unattended data so that they are both presented to the user.

When motion data is received, the processor 102 modifies the unattended data in accordance with the received motion data. The modified unattended data, which is presented to the user via the data presentation device 104, gives cues about the sensed motion. The modified unattended data is combined with the attended data so that they are presented simultaneously by the data presentation device 104. Additionally or alternatively, the unattended data may be modified in accordance with other types of input, including input from a sensor or user input.

The user can attend to the attended data while receiving motion cues via the modified unattended data. Attending to data refers to paying attention to the data on a conscious level, such as when the user is paying attention to the data that the user senses and purposefully processing it, for example, reading or mentally absorbing content of sensed data. The user senses the unattended data but may not be attending to the unattended data. Unattended data is data that the user senses and which the user's brain processes where the sensing and processing can be on a subconscious level. The user does not need to pay attention to the data or purposefully process it. The user may be unaware of the data contents. The user may be absorbed in processing the contents of the attended data and pay no attention to the unattended data. The motion cues are modifications to the unattended data based on received motion data. The user can sense and process the motion cues without attending to the unattended data. As the user attends to the attended data, the user's brain uses the motion cues to compensate for discordant multisensory information to reduce motion sickness, including avoiding the onset of, alleviating, and/or treating motion sickness, without a need for the user to attend to the unattended data.

Hardware processor 102 can be a processor included with a host device, such as a commercially available device, e.g., a personal computer; a computerized system incorporated into a moving vehicle or gadget, such as a boat, car, plane, or a virtual reality wearable device (e.g., a headset); a computerized system incorporated into a stationary system that simulates motion; a laptop computer; a television screen; a hand-held computing device, such as a smartphone, a personal digital assistant (PDA), or a cellular phone; or a system that uses three dimensional (3D) display technology (i.e., capable of conveying a stereoscopic perception of 3D depth to the viewer, where the user may or may not use 3D glasses), etc. Processor 102 may include one or more processors.

Figure 2:
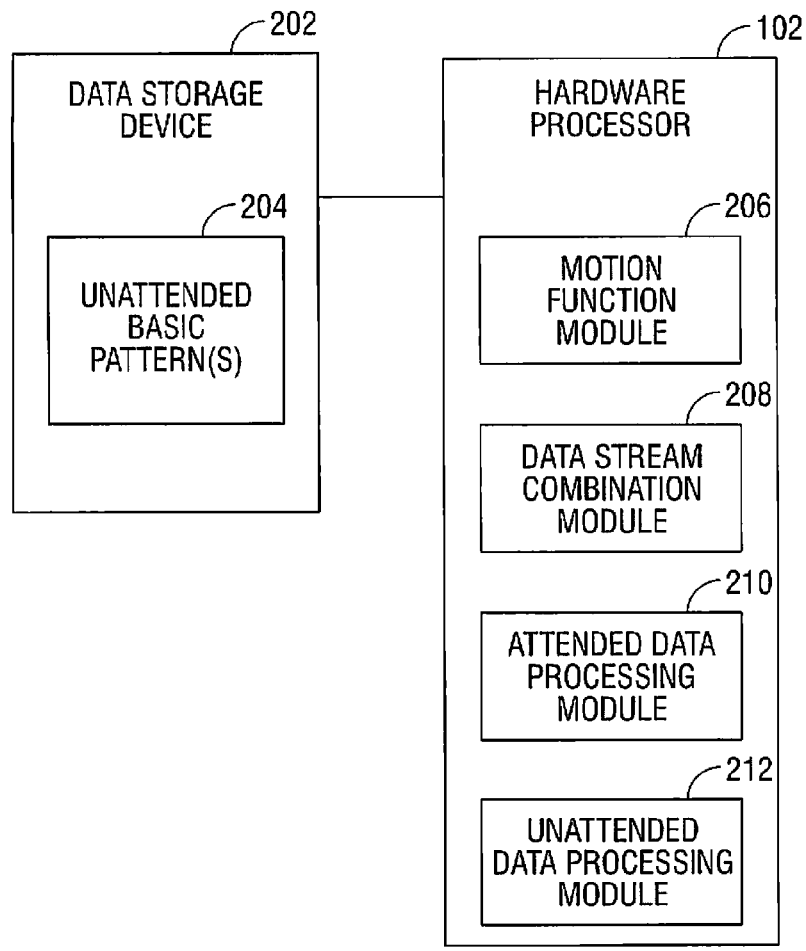
FIG. 2 is block diagram of an exemplary hardware processor in communication with a data storage device in accordance with the present disclosure.

As shown in FIG. 2, the processor 102 communicates with at least one data storage device 202 that may be external or internal to the host device. The at least one data storage device 202, which may include volatile and nonvolatile memory, stores various data, such as programming instructions (e.g., an operating system, one or more application programs, a network (e.g., Internet) browser, etc.) for execution by the hardware processor 102, data received from sensors that are internal or external to the host device, and/or application data input to or output from software applications executed by the hardware processor 102 or other processing devices. Additionally, the data storage device 202 stores a database of unattended basic patterns 204 storing at least one unattended basic pattern which is input to the processor 102 for the processor to modulate in accordance with detected motion.

A motion function software module 206, a data combination software module 208, and an attended data processing module 210 are provided for execution by the processor 102, which each include a series of programmable instructions capable of being executed by the processor 102. The series of programmable instructions can be stored on a computer-readable medium accessible by the processor 102, such as RAM, a hard drive, pen drive, DVD, Blu-ray Disk, CD, Smart Card, 3.5" diskette, SD card, micro SD card, or any other data storage device, for performing the functions disclosed herein and to achieve a technical effect in accordance with the disclosure. The motion function module 206, data combination module 208, and attended data processing module 210 provide functional and palpable applications in the field of computer technology. The functions of the motion function module 206, data combination module 208, and attended data processing module 210 may be combined into one module or distributed among a different combination of modules. The software modules 206, 208, and 210 may be downloadable, such as by a smartphone, a smart consumer electrical device, or a personal computer, from a remote source, such as a website (e.g., an App store that sells applications for smartphones).

With reference to FIGS. 1 and 2, the data presentation device 104 presents data output by the data combination module 208 so that the presented data can be sensed and processed by the user. The data presentation device 104 may include, for example, an electronic display device for visually displaying digital or analog data, such as a computer screen, an LCD screen, a digital reader, a television screen, a gaming device screen, a display screen for a cellular phone or a smartphone, a projector, a display screen for displaying 3D technology (with or without glasses), etc; an audio output device, such as speakers or headphones; or an output device that outputs a physical energy or force that is sensed by the somatosensory system, such as an air-blowing device, e.g., a fan that outputs blowing air, a vibrator that outputs tactilely sensed vibrations, a radiator that outputs heat (e.g., powered by an existing heat source in the moving vehicle, such as car engine or heater), an air conditioner or refrigerator system that outputs cold air, or a compressor, vent, or valve that can adjusts the pressure, e.g., in a passenger compartment of a moving vehicle. The MSM system 100 may use two or more presentation devices 104 at a time so that modulated unattended data may be presented to the user simultaneously via the two or more presentation devices 104.

The attended data is data provided to the processor 102 that the user wants to attend to. Attending to the data includes paying attention to the data on a conscious level. For example, the attended data may include data, such as text, graphics, or video that is displayed on a display device included with the data presentation device 104. The displayed attended data may be an electronic book or journal; a word-processing, spreadsheet, or graphics document; communication-based text (email, SMS messages, chats); presentation data (e.g., Power Point®); photographs; a movie; gaming visual data; simulation visual data; or virtual reality visual data, web browser, website, video, etc. The attended data may include audio data, such as a soundtrack to a movie, music, gaming sound data, etc. The attended data may include control data for controlling a mechanical force that is tactilely presented to the user, such as for controlling an air-blowing device, a vibrating device, a pressure control device, or a temperature control device. Attending to the tactilely presented data is includes the somatosensory system sensing the tactile input as a primary input.

The attended data processing module 210 includes software and/or hardware for processing the attended data. The attended data processing module 210 may process or execute, for example, an operating system, an application software program, a web browser program, etc. Programs processed by attended data processing module 210 may be stored, for example, by the data storage device 202.

The unattended data is provided to the processor 102 from the database of unattended basic patterns 204 stored by storage device 202 or received as streamed data. The unattended data may include data suitable for video or audio presentation or for control of a mechanical force that can be presented to the user, but that the user does not have to attend to in order to sense and process it. Accordingly, the unattended data may include a graphical screen or a series of graphical screens, e.g., a video data stream, for display; an audio file or streamed audio file for audio presentation, such as music or noise (e.g., white, pink, brown, popcorn, or random); and/or a control force or series of control forces for controlling a mechanical force for tactile presentation to the user. The unattended data may be received by the motion function module 206 where it is modulated based on an input, such as sensed motion, after which it is combined with the attended data by the data stream combination module 208, as described further below. Alternatively, the unattended data may be combined with the attended data by the data stream combination module 208, as described further below, without modulation by the motion function module 206.

The unattended data may be processed by the unattended data processing module 212 before it is provided to the motion function module 206 or the data stream combination module 208. The unattended data processing module 212 may process an unattended data pattern, which may include a single pattern or a continuous pattern, which may include, for example, a repeating pattern or non-repeating pattern that is continually provided to the motion function module 206 or the data steam combination module 208. The repeating pattern may be output by the unattended data processing module 212, for example, as a data stream. The unattended data processing module 212 may also modify the pattern in accordance with a pattern modification routine, which may be predefined, user generated, or random. A plurality of pattern modification routines may be stored with the unattended basic patterns 204. The pattern modification routine and/or related parameters may be user selectable. The unattended data processing module 212 may include a graphical user interface (GUI) through which a user may communicate with the unattended data processing module 212, such as for selecting or generating an unattended basic pattern, or for generating or selecting a pattern modification routine or modifying parameters to a pattern modification routine.

Unattended data may be presented to the user simultaneously via different presentation devices 104 that use different mediums. Unattended data may include one or more patterns selected from the database of unattended basic patterns 204, and may include independent objects that can be modified independent of the rest of the pattern. Modulation can be applied to a pattern as a whole or to individual objects. One or more objects may be related to one other, wherein they may be displayed as discrete graphical elements, but a single modification may affect all of the related objects.

When presented, the unattended data may be sensed and processed by the user, but the user need not attend to the data and it can be sensed and processed on a subconscious level while the user is consciously attending to the attended data. With respect to tactilely presented unattended data, the data sensed by the somatosensory system as a secondary input that combines with but does not override the attended data. The presentation of the unattended data does not interfere with the user having the ability to attend to the attended data. The two data-streams are combined and simultaneously presented to the user in a manner that is both effective and not overly distracting.

The database of unattended basic patterns 204 stores at least one pattern that is suitable for presentation via the presentation devices 104. A visual pattern may include, for example a displayable pattern of shapes, such as dots, wavy lines or bands, geometric shapes, or a logo, displayed in gray scale or color. The visual patterns are conducive to adjustments that indicate motion. Adjusting the position on the display of such shapes, groups of shapes, or associated edges (often non-symmetric), can demonstrate motion that corresponds to vectors associated with sensed motion, i.e. horizontal, vertical, orthogonal, and rotational. Corresponding adjustments to the shapes, groups of shapes or associated edges may include shifting in a horizontal direction, shifting in a vertical direction, dilating, and rotating.

In an embodiment, the visual pattern includes a static image or a series of at least two static images that are displayed consecutively and repetitively for creating an optical illusion of motion. When the unattended data forms an optical illusion that provides the user with a sense of motion, it may be displayed in combination with attended data without modulation by motion data and still provide relief from motion sickness. One example of a single static image that produces a sense of motion is a pattern well-known as "Rotating Snakes," Association for Research in Vision and Ophthalmology (2009, Feb. 3). Not Just Your Imagination: Brain Perceives Optical. In another example, the visual pattern includes a series of a first and second static image, wherein each image includes a series of concentric darker and lighter bands that can create the illusion of motion through a tunnel. The second image differs relative to the first image, such as by reversing which bands are lighter and which are darker, or by slightly offsetting the position of the bands in a selected direction. The visual pattern is displayed so that the presentation oscillates between the first and second images. In another example, a strobe light effect can be used to mimic the effect of motion on the visual system.

Figure 3A:
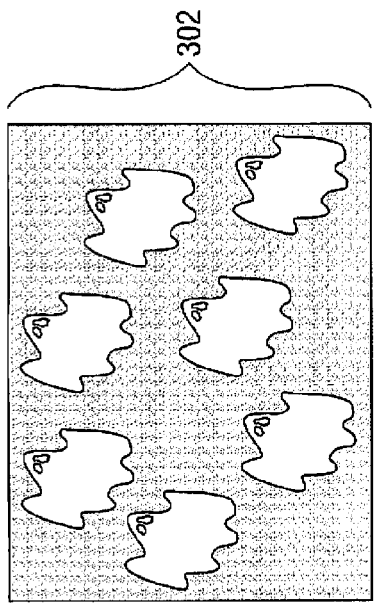
FIG. 3A shows an exemplary unattended pattern in accordance with the present disclosure.
Figure 3B:
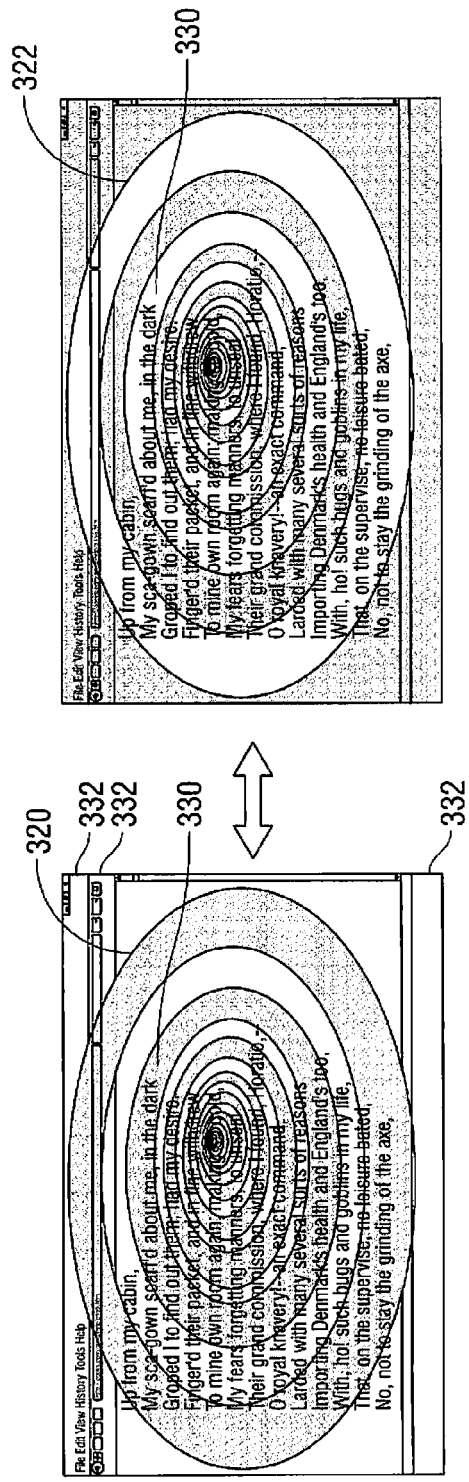
FIG. 3B shows exemplary complementary patterns that when displayed in an oscillating fashion produce an illusion of movement.

FIG. 3A shows an exemplary visually displayable unattended basic pattern 302. Pattern 302 may be adapted and configured to include individual objects or as a unitary pattern without objects. FIG. 3B shows unattended data having a series of patterns including a first pattern 320 and a second pattern 322 that complements pattern 320. A viewer may experience a sense of motion when the unattended data is displayed by oscillating between the first and second patterns 320 and 322 (i.e., displaying first pattern 320 followed by displaying second pattern 322, repetitively). As each of the first and second patterns 320 and 322 is displayed it is combined with attended data including text 330 and task bars 332 so that the unattended data and data are displayed substantially simultaneously. The rate of oscillation may be user selected or be set to a default rate. Due to the complementary nature of the first and second patterns 320 and 322 and the nature of the patterns 320 and 322 (here, concentric ovals that create a tunnel illusion), an optical illusion is created by oscillating between the patterns 320 and 322. The brain interprets oscillation between the first and second patterns 320 and 322 as deceleration or acceleration, producing a sense of motion, which may help to create a balance between vestibular sensations of actual motion and visual cues. Since a sense of motion is produced, this type of series of patterns may be used to prevent or treat motion sickness with or without sensing actual motion or adjusting the unattended data in accordance with sensed motion.

An audio pattern may include for example, an audio file of voice, music, or sound (e.g., white, brown, pink sound, etc.). A control pattern may include a control signal or a series of control signals, e.g., having a steady, pulsed, or wave pattern.

The motion data is provided to the processor 102 by a sensing device (not shown) that senses motion, such as rotation and linear and angular velocity, acceleration, jerk, and gravity. The sensing device may sense motion in 3-dimensions and output data that represents the sensed motion in 3-dimensions. The sensing of motion mimics vestibular detection of motion. Sensing devices for sensing motion include, for example, an accelerometer, global positioning system (GPS), gyroscope, or mechanical sensor. Alternatively, when the motion is simulated by a simulator (not shown), the motion information is provided to the processor 102 by the simulator. When the motion is simulated, such as by a computing system, such as a simulator or virtual reality game or training system, the motion data is based on the simulated motion generated by the computing system.

The motion function module 206 modulates the received unattended data in accordance with the motion data, e.g., modifying one or more values associated with characteristics of the unattended data as a function of a characteristic of motion, such as motion in the x, y, and/or z direction, acceleration (the $1^{st}$ derivative of motion), jerks (the $2^{nd}$ derivative of motion). Alternatively, modulation of the unattended data could be in accordance with rotational or tilting, such as by calculating expected detection by the vestibular system's semicircular canals (which corresponds to sensing rotational movement) and otolith organs (which corresponds to sensing a person's head tilts).

Modulation of a visual unattended basic pattern may include a shift in one or more selected characteristics of the pattern, such as contrast, resolution, chromaticity, brightness, luminance, hue, saturation, color, color balance, size and/or location. Shifts may affect the entire pattern or one or more objects included in the pattern. Location shifts may be, for example, horizontal, vertical, a combination thereof, or rotational. For example, a location shift to the right may correspond to a sensor-detected movement to the left. The sensor detection of motion further corresponds to the vestibular system's detection of movement.

In a 3D setting, e.g. where the presentation device includes a display screen adapted and configured for displaying in 3D, with or without a user using 3D glasses or a head mounted device, binocular detection of 3D motion can also be manipulated by representing perspectives of a 3D unattended pattern that correspond to the disparate images sensed by each eye's perspective.

The display device may show motion in 3-dimensions (e.g., represented by three perpendicular axes), such as by using a pattern that is graphically depicted in 3-dimensions, e.g., showing depth. The motion function module 206 may modulate the unattended data so that detected movement in each dimension of a 3-dimensional space the user is located in corresponds to a location shift of the pattern or a pattern object in a corresponding graphically depicted dimension, including simulated depth. The user may be able to select a technique for displaying the 3-dimensional motion data on the 2-dimensional display screen. For example, the user may select which axes in the 3-dimensional space that the motion takes place in (i.e., the user's space) corresponds to the respective axes in to the 2- or 3-dimensional display that is displayed on the 2-dimensional display screen Alternatively or additionally, the motion function module 206 may use two or more different types of shifts to correspond to motion detected in respective dimensions of the user's 3-dimensional space.

In one example, the motion function module 206 may modulate a pattern displayed on a 2-dimensional display screen of the display device in accordance with sensed accelerations that are orthogonal to the 2-dimensional display screen by adjusting the size of the pattern or pattern objects. Such accelerations, for example, may correspond to upward or downward motion which is orthogonal to the display screen that is oriented parallel to the ground. This may be the case for an electronic reader held on a lap or a screen located on a table or desk console. For example, such motion may correspond to the up and down motion of a car bumping along a rough road or boat rocking on waves. Similarly, such accelerations may correspond to accelerations directed in a forward or backward direction which are orthogonal to the display screen when it is oriented in a relatively upright manner, e.g. as in for the display screen of a laptop computer or an in-vehicle movie player. The motion function module 206 may modulate the pattern or pattern objects based on sensed accelerations or jerks (e.g., the first derivative of acceleration) orthogonal to the display screen by adjusting the size of the pattern or object, e.g., by shrinking of or enlarging the pattern or pattern object.

The modulations may be smooth or pulsed. For example, the luminance may be shifted in a stroboscopic manner. Stroboscopic shifts may be particularly effective, as stroboscopic modulations have recently been shown to reduce motion sickness in astronauts. Parts or regions of an image (e.g. center and/or periphery) or individual objects in an image may be modulated individually or as groups of objects, or the entire image may be modulated. Other visual modulations are envisioned.

Modulation of audio unattended data may include varying bandwidth, frequency, center frequency, amplitude, pitch, intervals between discrete sounds. Other modulations are envisioned. Modulation of control forces may include, for example, varying the direction of the force, the amplitude, the frequency (e.g., for vibrations), etc. For example, when controlling a fan, the fan may be controlled to blow air towards the user so that as the unattended data is modulated it mimics wind that the user would feel if the user were exposed to wind while experiencing the sensed motion, inducing a somatosensory sensation of motion.

Figure 4:
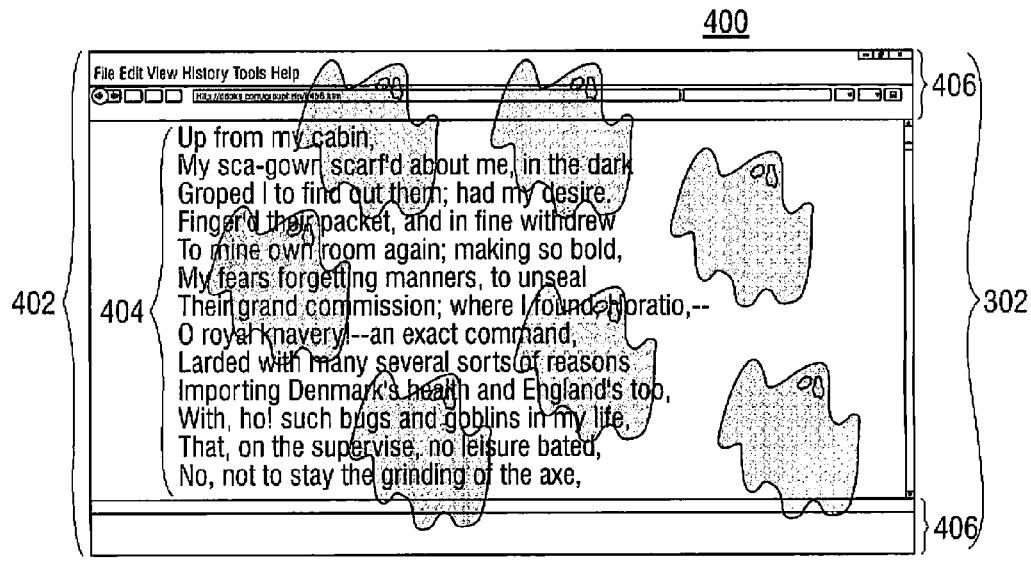
FIG. 4 shows an example of a screen shot of combined visual attended data and modulated unattended data patterns at a first time $t_1$.
Figure 5:
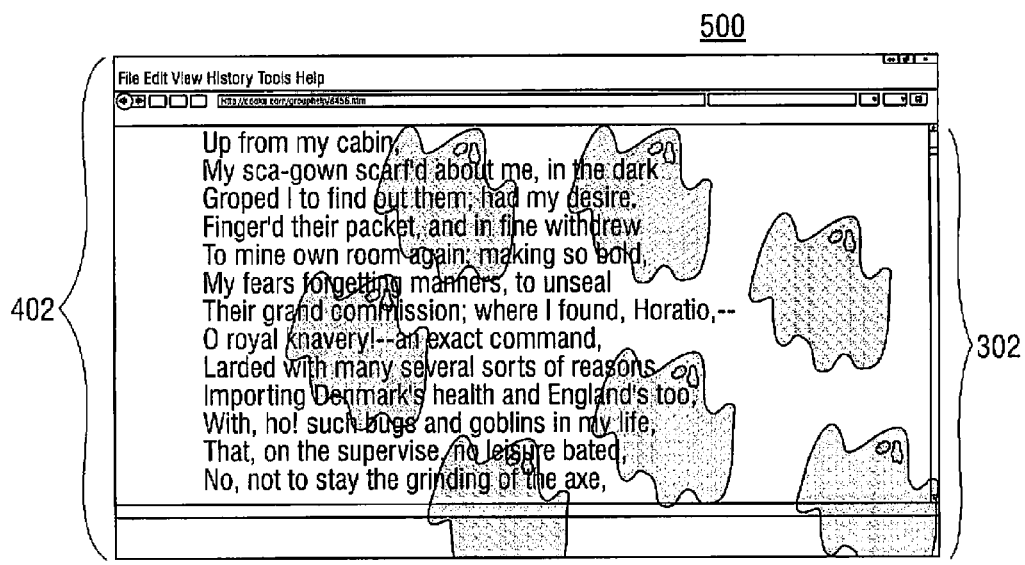
FIG. 5 shows an example of a screen shot of combined visual attended data and modulated unattended data patterns at a second time $t_2$ subsequent to $t_1$.

In addition to modulating the unattended pattern, the motion function module 206 may modulate attended data or objects within the attended data. For example, text that the user is attending to may be shifted briefly in response to sensed accelerations FIGS. 4 and 5 show screen shots 400 and 500, respectively, in which the visual unattended pattern 302 is displayed as a luminance modulation of the attended data 402, and further displaced in accordance with received motion data. The screen of attended data 402 includes a word processing window that includes display of a textual document 404 and task or functional areas 406 on the periphery that provide the user with access to application and operating system functions. The screen of attended data further includes a task bar at the bottom that provided access to operating system functions. Screen shots 400 and 500 were taken at times $t_1$ and $t_2$ (where $t_2$ is chronologically after $t_1$), respectively, as motion data was received and processed by motion function module 206 to modulate the unattended pattern 302. The location of pattern 302 shown in FIG. 5 is modulated via a vertical (downward) and horizontal (toward the right) shift relative to FIG. 4. The modulation is in response to received motion data that describing motion in the user's space that corresponds to the upward and left shifts such as are sensed by the vestibular system.

The data combination module 208 combines the attended data and the modulated unattended data and outputs the combined data to the data presentation device 104. The two sets of data, the attended data and the unattended data, are included in the combination so that one data set does not interfere (e.g., by replacing data or causing data to be erased or suppressed) with data in the other data set. In one embodiment, each data set is formed of elements and corresponding elements of the two sets of data are combined for generating a corresponding element in the combined data. The unattended data is combined with the attended data so that it overlaps the attended data so that it has an area or range in common with the attended data. This may include interleaving elements of the unattended data with elements of the attended data or combining values associated with elements of the unattended data and elements of the attended data.

For example, when the data sets include visually displayable data, the elements may be image elements of an array of image elements (e.g., a bit-map) that are presented via an array of pixels on a display device. Corresponding image elements may be associated with the same (x,y) coordinates, location, or pixel on the screen of the display device that they will be displayed on. Corresponding image elements, including a first pixel from the attended data set and a second pixel from the unattended data set having the same coordinates (x,y), are combined, such as by performing a mathematical function on values associated with one or more properties (e.g., chromaticity, hue, luminance, brightness, intensity, contrast, and/or color) having the same coordinates (x,y)) of both of the corresponding pixels. The mathematical function may include addition, subtraction, multiplication, division, inversion, powers, etc., or a combination thereof. Another type of combining includes interleaving corresponding image elements so that they are presented at adjacent or very close pixels. When they are viewed by a user, they appear to be combined as a single unit.

Table 1 below is an illustration of a set of programmable instructions for combining corresponding data elements of two data sets of visually displayable data by subtracting a weighted intensity value of image elements of the modulated unattended data from the intensity value of corresponding image elements of the attended data. The weight factor associated with the unattended data may be user selected.

TABLE 1

```
%simple model program for acceleration-sensitive image modulation to
%preempt/treat motion-sickness while performing visual tasks such as
reading, watching movies, typing, etc. on an
%accelerating platform such as a bus or boat. This code only reflects 1
%frame for modeling purpose only. Real code would generate a constantly
%changing display by combining the 2 constantly changing data-streams.
watermark_image=imread('tun01.jpg'); %fixed image/pattern
file used for motion-sensitive luminance modulation
            %of display and continuously refreshed
            %based on motion-sensitive hardware data
watermark_contrast=0.3; %user-defined setting based on subjective
effectiveness preferences
            %to minimize distraction while maximizing
            effectiveness
%while ON
task_image=imread('screenshot1.jpg'); %dynamic image sent to display
related to task and constantly refreshed
            %based on running programs and user interfacing
            %(what monitor would look like without app)
accelerateX=00;   %current acceleration horizontal coordinate
modified by accelerometers/gyroscopes etc. and constantly refreshed
accelerateY=00;   %vertical . . .
accelerateZ=1;    %perpendicular/depth . . .
rotationtheta=0;  %rotations
%Matlab-specific code for performing watermark motion functions.
%Other programs use different syntax to accomplish same goal.
se = translate(strel(1), [accelerateX accelerateY]);
watermark_image = imdilate(watermark_image,se);
%watermark_image = imresize(watermark_image,accelerateZ);
%watermark_image = imcrop(watermark_image,size(task_image));
image(task_image-(watermark_image/(1/watermark_contrast)));
axis ('off');
```

When mathematically combining values associated with a first and second element from the respective data sets of attended and unattended data, the first element may be weighted relative to the second element by a user selectable weight factor (e.g., watermark contrast in the example in Table 1), also referred to as the combination weight factor.

This allows the user to control how much the attended data should dominate the display relative to the unattended data. A user may even select the combination weight factor to allow the unattended data to dominate the presentation.

The combining may occur before or after the image elements are mapped to a pixel array of the display device. If it is performed before, the values associated with the corresponding image elements of the attended and unattended data are combined. If it is performed after, the values associated with the pixels that are mapped to the corresponding image elements of the attended and unattended data are combined.

It is envisioned that before mathematically combining values of elements from the attended and unattended data, the attended data is modified so that the combining will be more effective. This includes adjusting extreme values which are at or close to a maximum or minimum threshold value that the element can be set to. The extreme value is adjusted to be less extreme, i.e., more moderate, so that the combining will not exceed the threshold value. This is because if the combining exceeds the threshold value the combined value will have to be set to the threshold value, and the effect of the combining will be partially lost. For example, when the combining includes mathematically combining the luminance values of elements of the two sets of data, each element in the attended data that has an extreme luminance value, e.g., that corresponds to black (when combining includes adding the luminance value of the corresponding unattended element) or white (when combining includes subtracting the luminance value of the corresponding unattended element), is shifted to more moderate level, e.g., towards the gray range. This way, the adding or subtracting will be more effective or noticeable since the combining will have a greater effect on the extreme values.

In another embodiment, the combination includes using similar locations, but not the same locations for displaying corresponding pixels of the attended and the unattended data. For example, individual pixels or sets of pixels of the unattended data could be displayed at a location near or adjacent to the location that is associated with those pixels. The affect is to weave the display of the unattended data into the display of the attended data. In this way both data sets are displayed simultaneously. If the display resolution is high enough, each display might be comprised of pixels close enough to each other to enable the visual system to selectively attend to and selectively construct the attended pattern, while his/her subconscious successfully constructs the unattended pattern sensitive to the displays accelerations. As such, the two displays only occupy illusorily and/or approximately same locations though they actually are displayed in different pixels on the device.

The MSM system 100 is adapted and configured so that the user may select a variety of parameters. The user may select which data presentation device 104 or medium of presentation to use (e.g., audio, video, or tactile). The user may select a pattern or series of patterns from the database of unattended basic patterns 204. The user may also select parameters associated with the modulation, such as which types of motion will trigger modulation (e.g., rotational, angular, and/or linear accelerations; for a boat, motion caused by waves only; acceleration sensitivity ($1^{st}$ derivative); jerk-sensitivity ($2^{nd}$ derivative, or beyond), etc.); how the unattended basic pattern is modified based on the motion data (e.g., which characteristics of the pattern are shifted, whether the entire pattern or selected objects of the pattern are shifted, the size of the shift relative to the sensed motion, whether the shift is steady or intermittent (e.g., stroboscopic), or which dimensions in 2-dimensional data (e.g., unattended display data) correspond to sensed motion in 3-dimensional space).

The user may further select how elements of the attended and unattended data sets will be combined (e.g., weighting one data set, selecting which mathematical operations and functions to use for the combining). Additionally, the weighting may further be user selected so that a first set of elements are associated with a first weight and a second set of elements are associated with a second weight. For example, unattended data pixels that are located around the periphery of the screen may be weighted higher than the pixels that are not around the periphery so that the unattended data is more visible in the peripheral area. Such an implementation might be useful for users who find it more useful to have a less visible unattended pattern e.g. nearer to the center of the display and/or who find it more effective to have a more visible unattended pattern in the periphery.

In conclusion, the MSM system 100 provides for presenting unattended data to the user while the user is attending to a presentation attended data. When on a moving platform, the unattended data may be modulated in accordance with sensed motion. In a simulator or virtual reality application, the unattended data may be modulated in accordance with simulated motion.

The unattended and attended data are presented simultaneously to the user. They may be combined or presented independently and simultaneously, but in either case, the unattended data does not obstruct or interfere with the attended data.

The MSM system 100 may be used for a variety of applications. When providing for concurrent visual presentation of the unattended and attended data sets, the MSM system 100 can be used as tool for diagnosing or researching cognitive/visual processing. Another application of the MSM system 100 includes using the concurrent presentation of unattended and attended data for multitasking, where the unattended data does not require constant attention but requires event-monitoring.

In such a case, the user can attend to the attended data without attending to the concurrently presented unattended data. When the user's attention is required for the unattended data, such as upon the occurrence of an event, the user is presented with an alert, e.g., an audio, visual or tactile alert, such as an auditory beep or a pop-up window. At that point, the user can select to change the presentation of the unattended data so that the user can attend to it. The user may select to discontinue the combining of the unattended and attended data, such as to view the unattended data without combining it with the attended data, e.g., in a separate window of a computer display. Alternatively, the user may select to change the combination weight factor so that the unattended data is more perceivable.

The MSM system 100 may be used by advertisers to present advertisements ads concurrently with attended data. For example, an advertisement may be presented as unattended data, e.g. logos, banner ads with or without text, and/or videos, that is combined with attended data, such as a web page, text file, or video. In this fashion, the unattended data is sensed and processed by user without the user being required to attend to it. The user does not have to divert attention from the attended data or a related task or take any actions related to the unattended data. Since the unattended data can be presented in the same visual space as the attended data, the advertisement is not invisible.

The present method of concurrently presenting the advertisement as unattended data combined with attended data provides advantages over currently available advertising methods used with display screens. Unlike banner ads, the advertisement does not exclusively occupy any of the finite real-estate of the display screen because the attended data can still fill the entire display screen. Similarly, unlike commercials and previews, the advertisement does not interrupt or delay the attended data, as it appears concurrently with the attended data. The unattended data can fill the entire display or just a region of the display. That region can be user selectable.

Figure 6:
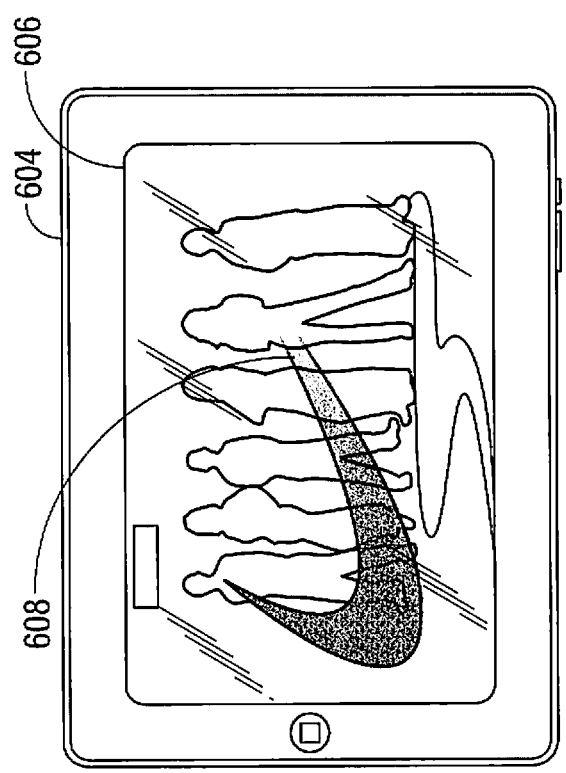
FIG. 6 shows exemplary first and second screen shots of combined visual attended data and modulated unattended data patterns taken at subsequent times in which the unattended data pattern uses a logo.
Figure 6:
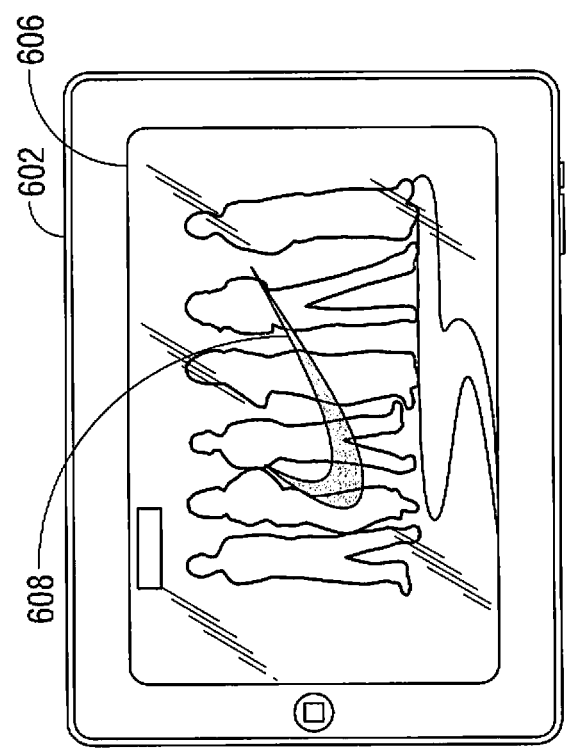

FIG. 6 shows how the MSM system 100 can provide for advertising while minimizing motion sickness of a user who is attending to data displayed on the display screen of a computing device. First and second screen shots 602 and 604 are shown displayed on a handheld computing device. The screen shots 602 and 604 show a combined display 606 in which an attended pattern and an unattended pattern are combined. The attended pattern includes a video stream that the user is attending to, and the unattended pattern includes one or more logos 608. The unattended pattern is modulated in accordance with input motion data and/or user selection. The modulation accounts for the shift in size of logo 608 in screen shot 604 relative to screen shot 602. In shot 604 the contrast of the logo 608 relative to the attended data is less than that of shot 602. The logo 608 in shot 604 is therefore much less noticeable. The user may have selected to reduce the contrast in shot 608 to a level that was not distracting to the user but provided enough input for providing motion sickness relief.

FIG. 6 may also represent a system and method for presenting advertising to a user who is attending to data displayed on the display screen of a computing device without distracting the user from the data that the user wants to attend to. This embodiment need not include motion detection or modulation of unattended data based on the motion detection. The logo 608 is visible to the user. Particularly in shot 604, the logo does not distract the user from the data that the user is attending to. The unattended data may be static. Alternatively, the unattended data and logo may be modulated in accordance with a selected routine or based on one or more selected inputs. The modulation may increase the user's awareness of the logo, even on a subconscious level, without distracting the user from the attended data. Unattended advertising data need not be still-frame logos but can also even appear as video ads which similarly modulate attended data such as text in a digital book. The video frames would also appear as modulation of the attended data and may or may not be sensitive to motion.

The user may increase or decrease the visibility of the unattended data relative to the attended data at will, such as by adjusting the combination weight factor. The user may choose to temporarily attend to the unattended data while still viewing or monitoring the attended data. Accordingly, the user may switch between attending to the unattended data and the attended data at will. For example, the attended data may include a movie or a televised ball game and the unattended data may include an interactive video game. The user may wish to take a partial break from attending to the attended data while still viewing or monitoring the attended data and temporarily adjust the combination weight factor so that the unattended data is more visible than the attended data.

Figure 7:
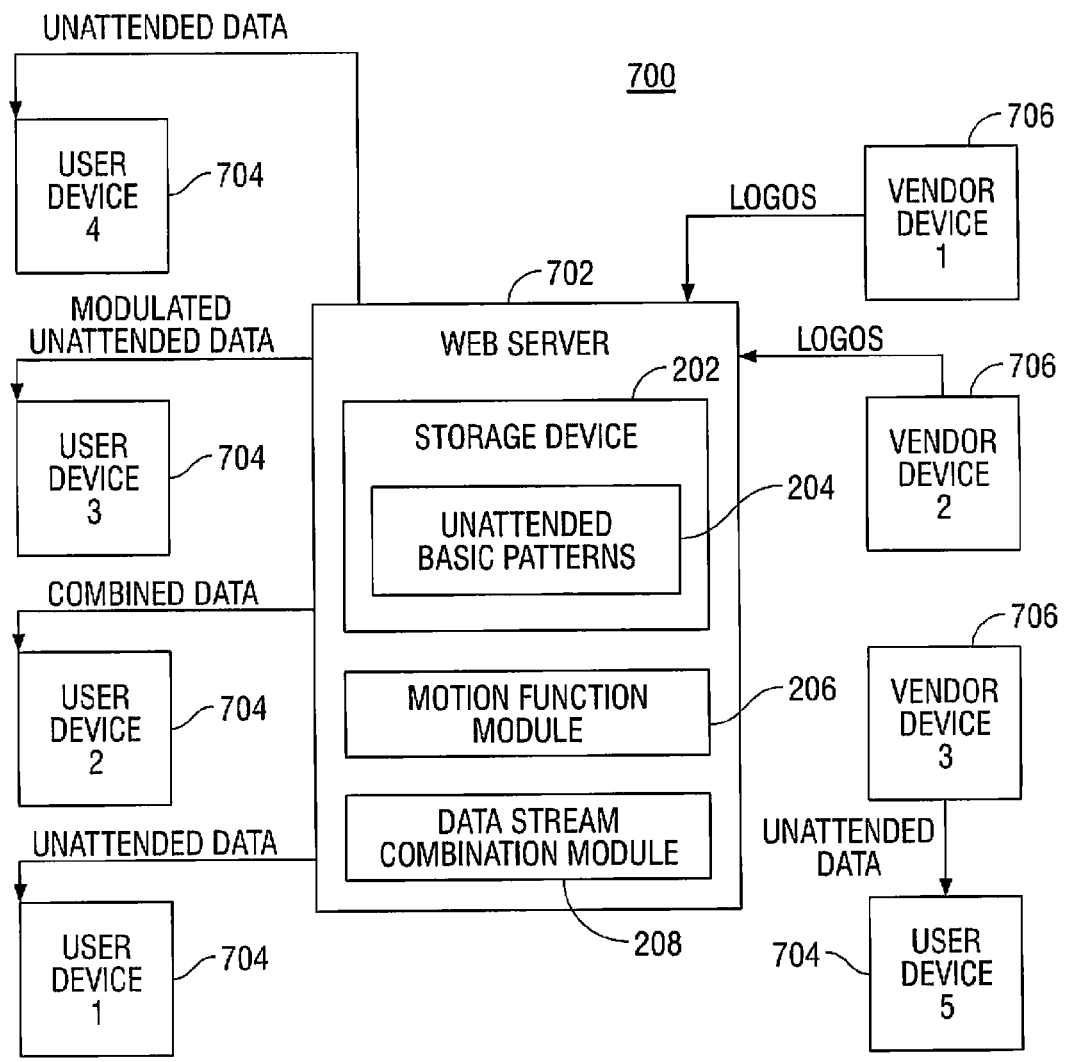
FIG. 7 is a schematic diagram of an exemplary network based system for advertising by distributing unattended data.

FIG. 7 shows a system and method for providing a business model for distributing advertising via an unattended pattern that is combined with an attended pattern and displayed to a user. Advertisement system 700 includes a web server 702, a plurality of user computing devices (user devices) 704, and a plurality of vendor computing devices (vendor devices) 706. Exemplary user devices 704 labeled 1-5 and exemplary vendor devices 706 labeled 1-3 are shown. Web server 702 communicates with the user computing devices 704 and vendor computing devices 706 via a network, such as the Internet or an intranet. Web server 702 is a computing device that provides a web page that the computing devices 704 and 706 can access for receiving and/or transmitting data to and from the web server 702. The computing devices 702, 704, and 706 each include a hardware processor for executing software programmable instructions, a storage device, communication software and hardware for communicating with other computing devices via the network, and hardware and software for interfacing with a user or administrator. The computing devices 702, 704, 706 may include a data stream combination module 208 and/or a motion function module 206 for execution by the associated processor.

The vendor devices 706 are each associated with a commercial vendor that seeks to advertise product or service. The vendor devices 706 may each have an arrangement with web server 702 for facilitating advertising by including their respective logos in an unattended basic pattern that is transmitted by the web server 702 to one or more user devices 704. The arrangement between the vendor devices 706 and web server 702 may include a financial transaction or a form of bartering goods or services. Alternatively, as shown by vendor device 3 and user device 5, the vendor device 706 may transmit an unattended basic pattern to the user device 704 without using the web server 702.

The user devices 704 receive one or more unattended basic patterns form the web server 702 or the vendor devices 706. This arrangement may also include an exchange of money, goods, or services. For example, a user operating a user device 704 may agree to receive advertising in the form of an unattended basic pattern or unattended data including the unattended basic pattern in exchange for a discount on a product or service. In another example, a product, such as a movie or an electronic book, may be provided to the user device together with at least one unattended basic pattern. The product may be combined with the unattended basic pattern and transmitted to the user device 704 as combined data (see user device 2). The combining may include combining corresponding pixels of the unattended data and the product by performing a mathematical function on a value associated with a property of both of the corresponding elements.

The unattended data may or may not be modulated. Modulation may be in response to detected motion, in accordance with a selected routine, or based on one or more other selected inputs. Modulation may be performed by the web server 702 or by the user device 704. When modulation is performed by the web server 702 it may be performed in real time. The user device 704 may transmit detected motion to the web server 702 which may modulate the unattended data and transmit the modulated unattended data to the user device 704 for display by the user device 704.

Combination of the unattended data (whether modulated or not) with attended data may be performed by the web server 702 or the user device 704. The attended data may be provided by the web server 702 or may be accessed by the user device 704 without involvement of the web server 702.

Figure 8:
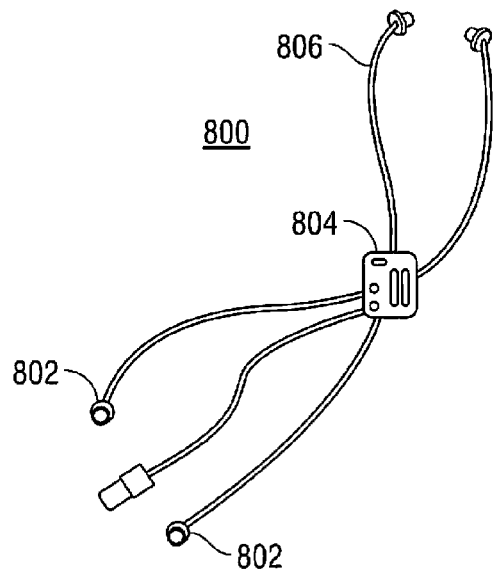
FIG. 8 shows a sample fragment of code from one possible algorithm for combining an unattended motion-sensitive patterns with an attended display.
Figure 9:
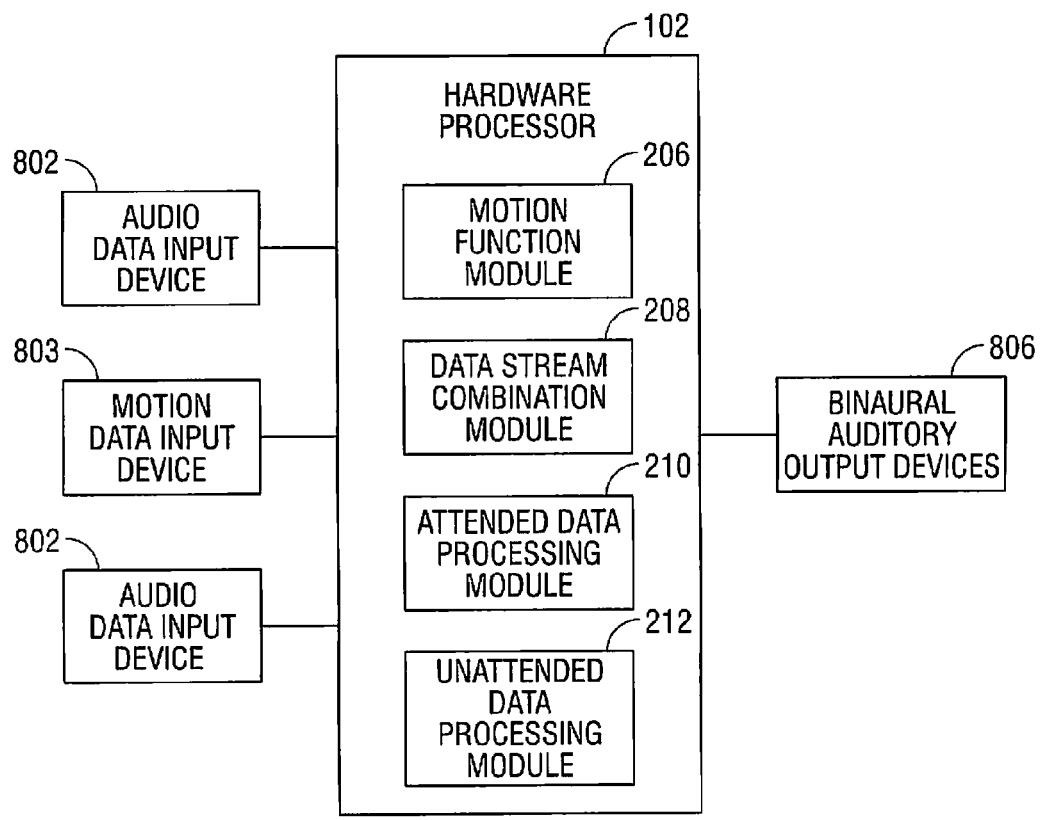

With reference to FIGS. 8 and 9 showing another embodiment of the disclosure, an audio signal integration system 800 is provided. Audio signal integration system 800 includes a data integration device 804 which receives two or more input audio data sets simultaneously via audio input devices 802. Optionally, motion data as described above with respect to MSM 100 may be received by the data integration device 804 via motion data input device 803. Data integration device 804 includes hardware processor 102 that executes one or more of modules 206, 208, 210, and 212 for processing the input audio data sets and/or combining them. Processor 102 executes data stream combination module 208 for combining the two or more audio data sets so that data from one data set does not interfere with data from the other data set. Data stream combination module 208 outputs combined audio data.

The combining may include applying a mathematical function to a value, associated with corresponding signals of each data set or interleaving signals. Values may be associated with characteristics of the signals such as pitch, quality and loudness. Signals may correspond, for example, in accordance with their position in an array of signals and/or in a series of signals.

The user may influence the combining via user input controls so that the user can attend to a selected one of the input audio data sets. The user may operate the user input controls to affect the combining and alternate between which input audio data set the user will attend to. Even when the output combined audio data is combined, such as by applying a mathematical function or interleaving corresponding signals from the two data sets, the combining is such that the data set selected from the two or more data sets is not overpowered by the other data set(s) and the user can recognize it and attend to it without attending to the other unselected data set(s).

The two or more data sets may be audio signals (analog or digital) independently generated by respective audio data sources (not shown), such as a DVD player, a radio; a laptop computer; a television screen; or a handheld computing device, such as a smartphone, a personal digital assistant (PDA), an MP3 player, or a cellular phone. Audio input devices 802 couple between the audio data source and processor 102. Audio input devices 802 are illustrated as being external to data integration device 804, but it is contemplated that one or more audio data sources and audio input devices 802 may be integrated with the data integration device 804 and disposed within data integration device's 804 housing. Examples of audio input devices 802 include surface-mounted connectors or jacks such as TS, TRS, or TRRS connectors.

Motion function module 206 may modify at least one of the attended or unattended data with the motion data. The audio data sets may be modulated in accordance with motion data and/or input other than motion data, such as user input.

It will be appreciated that the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for simultaneous visual data presentation comprising:
    at least one tangible processor; and
    a memory with instructions to be executed by the at least one tangible processor for:
    receiving attended data intended for a user to pay attention to on a conscious level, and wherein said attended data is selected from the group consisting of foreground text, graphics, and video;
    receiving unattended data intended for a user to not pay attention to on a conscious level, and wherein said unattended data is selected from the group consisting of background graphical scene, a series of background graphical screens, and at least one selectable pattern including an object;
    receiving motion data by a sensing device that senses motion of the apparatus, wherein said motion data is selected from the group consisting of rotation and linear and angular velocity, acceleration, jerk, and gravity;
    generating presentation data for simultaneous presentation of the attended data and the modified unattended data, wherein the unattended data at least partially overlaps the attended data and the unattended data does not replace, erase, or suppress the attended data;
    modifying solely the unattended data in response to the received motion data, wherein the modifying solely the unattended data includes (i) modifying a value associated with at least one characteristic of the unattended data as a function of a characteristic of the received motion data, and (ii) selecting from the group consisting of shifting in a horizontal direction, shifting in a vertical direction, dilating, and rotating; and
    wherein the unattended data is presented as a modification of at least one characteristic of the attended data selected from the group of characteristics consisting of contrast, resolution, chromaticity, brightness, luminance, hue, saturation, color, color balance, size, and location.

2. The data presentation system according to claim 1 wherein the unattended data includes a first plurality of elements and the attended data includes a second plurality of elements that correspond to respective elements of the first plurality of elements;
    wherein the generating presentation data includes combining values associated with corresponding elements of the first and second plurality of elements.

3. The data presentation system according to claim 2, wherein the combining corresponding elements includes performing a mathematical function on a value associated with a property of both of the corresponding elements.

4. The data presentation system according to claim 3, wherein the mathematical function is user selectable.

5. The data presentation system according to claim 2, wherein the combining values associated with corresponding first and second elements includes weighting the value associated with the first element relative to the value associated with the second element by a user selectable weight factor.

6. The data presentation system according to claim 3, wherein the elements of the first and second plurality of elements are image elements, the combining is performed before or after the image elements are mapped to a pixel array, and the presentation data is suitable for display by an electronic display device.

7. The data presentation system according to claim 6, wherein the property associated with the corresponding elements is selected from the group of properties consisting of: intensity, luminance, hue, saturation, chromaticity, or contrast, or some combination thereof.

8. The data presentation system according to claim 1, wherein the presentation data includes data suitable for video or audio presentation or for control of a mechanical force suitable for presentation to the user.

9. The data presentation system according to claim 1, wherein the at least one characteristic of the unattended data is user selectable.

10. The data presentation system according to claim 1, wherein the function is user selectable.

11. The data presentation system according to claim 1, wherein a threshold level of a characteristic of the sensed motion triggers modification of the unattended data, and the threshold level is user selectable.

12. The data presentation system according to claim 1, wherein the motion is sensed in three dimensions and the presentation device is a 2-dimensional display screen, wherein a technique for corresponding the 3-dimensional motion to the 2-dimensional display is user selectable.

13. The data presentation system according to claim 1, wherein the modifying each pattern includes modifying the object independently of portions of the pattern that are not included with the object.

14. The data presentation system according to claim 1, wherein the modifying includes generating modifications that are pulsed.

15. The data presentation system according to claim 1, wherein the unattended data includes data adapted and configured for an advertisement presentation.

16. The data presentation system according to claim 1, wherein the system is selected from the group of systems consisting of a personal computer; a computerized system incorporated into a moving vehicle; a computerized system incorporated into a virtual reality wearable device; a computerized system incorporated into a stationary system that simulates motion; a laptop computer; a television screen, a handheld computing device; a smartphone; a personal digital assistant; a global positioning device, a device that uses 3D display technology, and a cellular phone.

17. A method for simultaneous data presentation comprising:
receiving, by at least one hardware processor, attended data intended for a user to pay attention to on a conscious level, and wherein said attended data is selected from the group consisting of foreground text, graphics, and video;
receiving, by the at least one hardware processor, unattended data intended for a user to not pay attention to on a conscious level, and wherein said unattended data is selected from the group consisting of background graphical scene, a series of background graphical screens, and at least one selectable pattern including an object;
receiving, by the at least one hardware processor, motion data sensed by a sensing device that senses motion of the apparatus, wherein said motion data is selected from the group consisting of rotation and linear and angular velocity, acceleration, jerk, and gravity;
generating presentation data for simultaneous presentation of the attended data and the modified unattended data, wherein the unattended data at least partially overlaps the attended data and the unattended data does not replace, erase, or suppress the attended data;
modifying, by the at least one hardware processor, solely the unattended data in response to the received motion data,
wherein the modifying solely the unattended data includes (i) modifying a value associated with at least one characteristic of the unattended data as a function of a characteristic of the received motion data, and (ii) selecting from the group consisting shifting in a horizontal direction, shifting in a vertical direction, dilating, and rotating; and
wherein the unattended data is presented as a modification of at least one characteristic of the attended data selected from the group of characteristics consisting of contrast, resolution, chromaticity, brightness, luminance, hue, saturation, color, color balance, size, and location.

18. The method according to claim 17, wherein the unattended data includes a first plurality of image elements and the attended data includes a second plurality of image elements that correspond to respective elements of the first plurality of pixels;
wherein the generating presentation data includes combining values associated with corresponding image elements of the first and second plurality of image elements.

19. The method according to claim 17, wherein the displayed modified unattended data gives cues about the sensed or simulated motion for the user to sense and process for compensating for discordant multisensory information and minimizing motion sickness while attending to the displayed attended data, without a need for the user to attend to the displayed unattended data.

* * * * *